(12) United States Patent
Narayan et al.

(10) Patent No.: US 7,394,879 B2
(45) Date of Patent: Jul. 1, 2008

(54) SYSTEMS AND METHODS FOR PARALLEL SIGNAL CANCELLATION

(75) Inventors: Anand P. Narayan, Boulder, CO (US); John K. Thomas, Erie, CO (US); Eric S. Olson, Boulder, CO (US)

(73) Assignee: Tensorcomm, Inc., Westminster, CO (US)

( * ) Notice: Subject to any disclaimer, the term of this patent is extended or adjusted under 35 U.S.C. 154(b) by 712 days.

(21) Appl. No.: 10/773,777

(22) Filed: Feb. 6, 2004

(65) Prior Publication Data
US 2004/0160924 A1   Aug. 19, 2004

Related U.S. Application Data

(63) Continuation-in-part of application No. 10/763,346, filed on Jan. 23, 2004, now Pat. No. 7,039,136, which is a continuation-in-part of application No. 10/686,828, filed on Oct. 15, 2003, which is a continuation-in-part of application No. 10/686,829, filed on Oct. 15, 2003, which is a continuation-in-part of application No. 10/699,360, filed on Oct. 31, 2003, which is a continuation-in-part of application No. 10/686,359, filed on Oct. 15, 2003, now Pat. No. 7,068,706, which is a continuation-in-part of application No. 10/669,954, filed on Sep. 23, 2003, which is a continuation-in-part of application No. 10/294,834, filed on Nov. 15, 2002, now Pat. No. 7,200,183, which is a continuation-in-part of application No. 09/988,219, filed on Nov. 19, 2001.

(60) Provisional application No. 60/445,243, filed on Feb. 6, 2003.

(51) Int. Cl.
*H03D 1/04* (2006.01)

(52) U.S. Cl. ................................. 375/346; 375/349

(58) Field of Classification Search .............. 375/148, 375/144, 346, 348, 349
See application file for complete search history.

(56) References Cited

U.S. PATENT DOCUMENTS 3,742,201 A     6/1973   Groginsky
(Continued)

FOREIGN PATENT DOCUMENTS

| DE | 4201439 A1 | 7/1993 |
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Emmanuel Bayard
(74) *Attorney, Agent, or Firm*—Anand P. Narayan

(57) ABSTRACT

The present invention provides systems and methods for parallel interference suppression. In one embodiment of the invention, a processing engine is used to substantially cancel a plurality of interfering signals within a received signal. The processing engine includes a plurality of matrix generators that are used to generate matrices, each matrix comprising elements of a unique interfering signal selected for cancellation. The processing engine also includes one or more processors that use the matrices to generate cancellation operators. A plurality of applicators applies the cancellation operators to parallel but not necessarily unique input signals to substantially cancel the interfering signals from the input signals. These input signals may include received signals, interference cancelled signals and/or PN codes. The embodiments disclosed herein may be particularly advantageous to systems employing CDMA (e.g., such as cdmaOne and cdma2000), Wideband CDMA, Broadband CDMA and Global Positioning Systems ("GPS") signals.

51 Claims, 5 Drawing Sheets

U.S. PATENT DOCUMENTS

| | | | |
|---|---|---|---|
| 4,088,955 | A | 5/1978 | Baghdady |
| 4,309,769 | A | 1/1982 | Taylor, Jr. |
| 4,359,738 | A | 11/1982 | Lewis |
| 4,601,046 | A | 7/1986 | Halpern |
| 4,665,401 | A | 5/1987 | Garrard et al. |
| 4,670,885 | A | 6/1987 | Parl et al. |
| 4,713,794 | A | 12/1987 | Byington et al. |
| 4,780,885 | A | 10/1988 | Paul et al. |
| 4,856,025 | A | 8/1989 | Takai |
| 4,893,316 | A | 1/1990 | Janc et al. |
| 4,922,506 | A | 5/1990 | McCallister et al. |
| 4,933,639 | A | 6/1990 | Barker |
| 4,965,732 | A | 10/1990 | Roy, III et al. |
| 5,017,929 | A | 5/1991 | Tsuda |
| 5,099,493 | A | 3/1992 | Zeger et al. |
| 5,105,435 | A | 4/1992 | Stilwell |
| 5,109,390 | A | 4/1992 | Gilhousen et al. |
| 5,119,401 | A | 6/1992 | Tsujimoto |
| 5,136,296 | A | 8/1992 | Roettger et al. |
| 5,151,919 | A | 9/1992 | Dent |
| 5,218,359 | A | 6/1993 | Minamisono |
| 5,218,619 | A | 6/1993 | Dent |
| 5,220,687 | A | 6/1993 | Ichikawa et al. |
| 5,224,122 | A | 6/1993 | Bruckert |
| 5,237,586 | A | 8/1993 | Bottomley |
| 5,263,191 | A | 11/1993 | Dickerson |
| 5,280,472 | A | 1/1994 | Gilhousen et al. |
| 5,305,349 | A | 4/1994 | Dent |
| 5,325,394 | A | 6/1994 | Bruckert |
| 5,343,493 | A | 8/1994 | Karimullah |
| 5,343,496 | A | 8/1994 | Honig et al. |
| 5,347,535 | A | 9/1994 | Karasawa et al. |
| 5,353,302 | A | 10/1994 | Bi |
| 5,377,183 | A | 12/1994 | Dent |
| 5,386,202 | A | 1/1995 | Cochran et al. |
| 5,390,207 | A | 2/1995 | Fenton et al. |
| 5,394,110 | A | 2/1995 | Mizoguchi |
| 5,396,256 | A | 3/1995 | Chiba et al. |
| 5,437,055 | A | 7/1995 | Wheatley, III |
| 5,440,265 | A | 8/1995 | Cochran et al. |
| 5,448,600 | A | 9/1995 | Lucas |
| 5,481,570 | A | 1/1996 | Winters |
| 5,506,865 | A | 4/1996 | Weaver, Jr. |
| 5,513,176 | A | 4/1996 | Dean et al. |
| 5,533,011 | A | 7/1996 | Dean et al. |
| 5,553,098 | A | 9/1996 | Cochran et al. |
| 5,602,833 | A | 2/1997 | Zehavi |
| 5,644,592 | A | 7/1997 | Divsalar |
| 5,736,964 | A | 4/1998 | Ghosh et al. |
| 5,787,130 | A | 7/1998 | Kotzin et al. |
| 5,844,521 | A | 12/1998 | Stephens et al. |
| 5,859,613 | A | 1/1999 | Otto |
| 5,872,540 | A | 2/1999 | Casabona |
| 5,872,776 | A | 2/1999 | Yang |
| 5,894,500 | A | 4/1999 | Bruckert et al. |
| 5,926,761 | A | 7/1999 | Reed et al. |
| 5,930,229 | A | 7/1999 | Yoshida et al. |
| 5,953,369 | A | 9/1999 | Suzuki |
| 5,978,413 | A | 11/1999 | Bender |
| 5,995,499 | A | 11/1999 | Hottinen et al. |
| 6,002,727 | A | 12/1999 | Uesugi |
| 6,014,373 | A | 1/2000 | Schilling et al. |
| 6,018,317 | A | 1/2000 | Dogan et al. |
| 6,032,056 | A | 2/2000 | Reudink |
| 6,088,383 | A | 7/2000 | Suzuki et al. |
| 6,101,385 | A | 8/2000 | Monte et al. |
| 6,104,712 | A | 8/2000 | Robert et al. |
| 6,115,409 | A | 9/2000 | Upadhyay et al. |
| 6,127,973 | A | 10/2000 | Choi et al. |
| 6,131,013 | A | 10/2000 | Bergstrom et al. |
| 6,137,788 | A | 10/2000 | Sawahashi et al. |
| 6,141,332 | A | 10/2000 | Lavaen |
| 6,154,443 | A | 11/2000 | Huang et al. |
| 6,157,685 | A | 12/2000 | Tanaka et al. |
| 6,157,842 | A | 12/2000 | Karlsson et al. |
| 6,157,847 | A | 12/2000 | Buehrer et al. |
| 6,163,696 | A | 12/2000 | Bi et al. |
| 6,166,690 | A | 12/2000 | Lin et al. |
| 6,172,969 | B1 | 1/2001 | Kawakami et al. |
| 6,175,587 | B1 | 1/2001 | Madhow et al. |
| 6,192,067 | B1 | 2/2001 | Toda et al. |
| 6,201,799 | B1 | 3/2001 | Huang et al. |
| 6,215,812 | B1 | 4/2001 | Young et al. |
| 6,219,376 | B1 | 4/2001 | Zhodzishsky et al. |
| 6,222,828 | B1 | 4/2001 | Ohlson et al. |
| 6,230,180 | B1 | 5/2001 | Mohamed |
| 6,233,229 | B1 | 5/2001 | Ranta et al. |
| 6,233,459 | B1 | 5/2001 | Sullivan et al. |
| 6,240,124 | B1 | 5/2001 | Wiedeman et al. |
| 6,252,535 | B1 | 6/2001 | Kober et al. |
| 6,256,336 | B1 | 7/2001 | Rademacher et al. |
| 6,259,688 | B1 | 7/2001 | Schilling et al. |
| 6,263,208 | B1 | 7/2001 | Chang et al. |
| 6,266,529 | B1 | 7/2001 | Chheda |
| 6,275,186 | B1 | 8/2001 | Kong |
| 6,278,726 | B1 | 8/2001 | Mesecher et al. |
| 6,282,231 | B1 | 8/2001 | Norman et al. |
| 6,282,233 | B1 | 8/2001 | Yoshida |
| 6,285,316 | B1 | 9/2001 | Nir et al. |
| 6,285,319 | B1 | 9/2001 | Rose |
| 6,285,861 | B1 | 9/2001 | Bonaccorso et al. |
| 6,301,289 | B1 | 10/2001 | Bejjani et al. |
| 6,304,618 | B1 | 10/2001 | Hafeez et al. |
| 6,308,072 | B1 | 10/2001 | Labedz et al. |
| 6,310,704 | B1 | 10/2001 | Dogan et al. |
| 6,317,453 | B1 | 11/2001 | Chang |
| 6,321,090 | B1 | 11/2001 | Soliman |
| 6,324,159 | B1 | 11/2001 | Mennekens et al. |
| 6,327,471 | B1 | 12/2001 | Song |
| 6,330,460 | B1 | 12/2001 | Wong et al. |
| 6,333,947 | B1 | 12/2001 | van Heeswyk et al. |
| 6,351,235 | B1 | 2/2002 | Stilp |
| 6,351,642 | B1 | 2/2002 | Corbett et al. |
| 6,359,874 | B1 | 3/2002 | Dent |
| 6,362,760 | B2 | 3/2002 | Kober et al. |
| 6,363,104 | B1 | 3/2002 | Bottomley |
| 6,377,636 | B1 | 4/2002 | Paulraj et al. |
| 6,380,879 | B2 | 4/2002 | Kober et al. |
| 6,385,264 | B1 | 5/2002 | Terasawa |
| 6,396,804 | B2 | 5/2002 | Odenwalder |
| 6,404,760 | B1 | 6/2002 | Holtzman et al. |
| 6,430,216 | B1 | 8/2002 | Kober et al. |
| 6,459,693 | B1 | 10/2002 | Park et al. |
| 6,501,788 | B1 | 12/2002 | Wang |
| 6,515,980 | B1 | 2/2003 | Bottomley |
| 6,570,909 | B1 | 5/2003 | Kansakoski |
| 6,574,270 | B1 | 6/2003 | Madkour |
| 6,580,771 | B2 | 6/2003 | Kenney |
| 6,584,115 | B1 | 6/2003 | Suzuki |
| 6,590,888 | B1 | 7/2003 | Ohshima |
| 6,680,727 | B2 | 1/2004 | Butler |
| 6,798,737 | B1 | 9/2004 | Dabak |
| 6,801,565 | B1 | 10/2004 | Bottomley |
| 6,975,666 | B2 * | 12/2005 | Affes et al. ............... 375/130 |
| 2001/0003443 | A1 | 6/2001 | Velazquez et al. |
| 2001/0020912 | A1 | 9/2001 | Naruse et al. |
| 2001/0021646 | A1 | 9/2001 | Antonucci et al. |
| 2001/0028677 | A1 * | 10/2001 | Wang et al. ............... 375/148 |
| 2001/0046266 | A1 | 11/2001 | Rakib et al. |
| 2002/0001299 | A1 | 1/2002 | Petch et al. |
| 2002/0051433 | A1 | 5/2002 | Affes et al. |
| 2002/0172173 | A1 | 11/2002 | Schilling et al. |
| 2002/0176488 | A1 | 11/2002 | Kober et al. |

2003/0053526 A1    3/2003    Reznik

OTHER PUBLICATIONS

Schneider, Optimum Detection of Code Division Multiplexed Signals, IEEE Transactions on Aerospace and Electronic Systems, Jan. 1979, vol. AES-15 No 1.
Mitra, et al., Adaptive Receiver Algorithms for Near-Far Resistant CDMA, IEEE Transactions of Communications, Apr. 1995.
Lupas, et al. Near-Far Resistance of Multiuser Detectors in Asynchronous Channels, IEEE Transactions on Communications, Apr. 1990, vol. 38, No. 4.
Lupas, et al., Linear Multiuser Detectors for Synchronous Code-Division Multiple-Access Channels, IEEE Transactions on Information Theory, Jan. 1989, vol. 35, No. 1.
Kohno, et al., Cancellation Techniques of Co-Channel Interference in Asynchronous Spread Spectrum Multiple Access Systems, May 1983, vol. J 56-A. No. 5.
Garg, et al., Wireless and Personal Communications Systems, 1996, pp. 79-151, Prentice Hall, Upper Saddle River, NJ, US.
Cheng, et al., Spread-Spectrum Code Acquisition in the Presence of Doppler Shift and Data Modulation, IEEE Transactions on Communications, Feb. 1990, vol. 38, No. 2.
Behrens et al., Parameter Estimation in the Presence of Low Rank Noise, pp. 341-344, Maple Press, 1988.
Best, Phase-Locked Loops—Design, Simulation, and Applications, pp. 251-287, McGraw-Hill, 1999.
Iltis, Multiuser Detection of Quasisynchronous CDMA Signals Using Linear Decorrelators, IEEE Transactions on Communications, Nov. 1996, vol. 44, No. 11.
Rappaport, Wireless Communications—Principles & Practice, 1996, pp. 518-533, Prentice Hall, Upper Saddle River, NJ, US.
Scharf, et al., Matched Subspace Detectors, IEEE Transactions on Signal Processing, Aug. 1994, vol. 42, No. 8.
Price et al., A Communication Technique for Multipath Channels, Proceedings to the IRE, 1958, vol. 46, The Institute of Radio Engineers, New York, NY, US.
Affes et al., Interference Subspace Rejection: A Framework for Multiuser Detection in Wideband CDMA, IEEE Journal on Selected Areas in Communications, Feb. 2002, vol. 20, No. 2.
Schlegel et al., Coded Asynchronous CDMA and Its Efficient Detection, IEEE Transactions on Information Theory, Nov. 1998, vol. 44, No. 7.
Xie et al., A family of Suboptimum Detectors for Coherent Multiuser Communications, IEEE Journal on Selected Areas in Communications, May 1990, vol. 8, No. 4.
Viterbi, Very Low Rate Convolutional Codes for Maximum Theoretical Performance of Spread Spectrum Multiple-Access Channels, IEEE Journal on Selected Areas in Communications, May 1980, vol. 8, No. 4.
Viterbi, CDMA—Principles of Spread Spectrum Communication, 1995, pp. 11-75 and 179-233, Addison-Wesley, Reading, MA, US.
Verdu, Mimimum Probability of Error for Asynchronous Gaussian Multiple-Access Channels, IEEE Transactions on Information Theory, Jan. 1986, vol. IT-32, No. 1.
Kaplan, Understanding GPS—Principles and Applications, 1996, pp. 83-236, Artech House, Norwood, MA, US.
Scharf, Statistical Signal Processing—Detection, Estimation, and Time Series Analysis, 1990, pp. 23-75 and 103-178, Addison-Wesly, Reading, MA, US.
Stimson, Introduction to Airborne Radar 2nd edition, 1998, pp. 163-176 and 473-491, SciTech Publishing, Mendham, NJ, US.
Behrens et al., Signal Processing Applications of Oblique Projection Operators, IEEE Transactions on Signal Processing, Jun. 1994, vol. 42, No. 6.
Alexander et al., A Linear Receiver for Coded Multiuser CDMA, IEEE Transactions on Communications, May 1997, vol. 45, No. 5.
Schlegel et al., Multiuser Projection Receivers, IEEE Journal on Selected Areas in Communications, Oct. 1996, vol. 14, No. 8.
Halper et al., Digital-to-Analog Conversio n by Pulse-Count Modulation Methods, IEEE Transactions on Instrumentation and Measurement, Aug. 1996, vol. 45, No. 4.
Ortega et al., Analog to Digital and Digital to Analog Conversion Based on Stochastic Logic, IEEE 0-7803-3026-9/95, 1995.
Frankel et al., High-performance photonic analogue digital converter, Electronic Letters, Dec. 4, 1997, vol. 33, No, 25.
Lin et al., Digital Filters for High Performance Audio Delta-sigma Analog-to-digital and Digital-to-analog Conversions, Proceedings of ICSP, Crystal Semiconductor Corporation 1996. Austin, TX, US.
Thomas, Thesis for the Doctor of Philosophy Degree, UMI Dissertation Services, Jun. 1996, Ann Arbor, MI, US.
Schlegel et al., Projection Receiver: A New Efficient Multi-User Detector, IEEE, 1995, 0-7803-2509-5/95.
Behrens, Subspace Signal Processing in Structured Noise, UMI Dissertation Services, Jun. 1990, Ann Arbor, MI, US.

* cited by examiner

SYSTEMS AND METHODS FOR PARALLEL SIGNAL CANCELLATION

CROSS REFERENCE TO RELATED APPLICATIONS

This application claims priority to U.S. Provisional Patent Application 60/445,243 (filed Feb. 6, 2003), which is herein incorporated by reference. This application is also a continuation-in-part of U.S. patent application Ser. No. 10/669,954 (filed Sep. 23, 2003; the "'954 application"), Ser. No. 10/686,828 (filed Oct. 15, 2003; the "'828 application"), Ser. No. 10/686,829 (filed Oct. 15, 2003; the "'829 application"), Ser. No. 10/699,360 (filed Oct. 31, 2003; the "'360 application"), Ser. No. 10/294,834 (filed Nov. 15, 2002; now U.S. Pat. No. 7,200,183 the "'834 application"), Ser. No. 10/686,359 (filed Oct. 15, 2003; now U.S. Pat. No. 7,068,706 the "'359 application") and Ser. No. 10/763,346 (filed Jan. 23, 2004 now U.S. Pat. No. 7,039,136; the "'346 application"), which are all hereby incorporated by reference. This application is also related to Ser. No. 09/988,219 (filed Nov. 19, 2001; the "'219 application"), which is hereby incorporated by reference.

BACKGROUND

1. Field of the Invention

The invention generally relates to the field of communications. More specifically the invention is related to interference suppression for use in coded signal communications, such as Code Division Multiple Access ("CDMA") communications.

2. Discussion of the Related Art

Interference in communications obstructs the intended reception of a signal and is a persistent problem. Interference may exist in many forms. In CDMA communications, for example, interference is typically the result of receiving one or more unwanted signals simultaneously with a selected signal. These unwanted signals may disrupt the reception of the selected signal because of mutual interference. This disruption of the selected signal is typical in CDMA telephony systems and may corrupt data retrieval processes of a selected signal.

In CDMA telephony, a communications system typically includes a plurality of "base stations" providing a coverage area within a geographic region. These base stations communicate with mobile telephones and/or other CDMA devices operating within the coverage area. To illustrate, a base station provides a coverage "cell" within the overall communication coverage area maintained by the communications system. While within a particular cell, a mobile telephone, or "handset", can communicate with the base station providing the coverage for that cell. As the mobile telephone moves to the cell of another base station, communications between the mobile telephone and the base station providing the initial cell coverage can be transferred via a "hand off" to the other base station.

Each base station within a CDMA telephony system uses coded signals to communicate with mobile telephones. For example, typical CDMA telephony systems use pseudorandom number (PN) spreading codes, sometimes referred to as "short codes," to encode data signals. These encoded data signals are transmitted to and from mobile telephones to convey digitized voice and/or other forms of communication. PN codes are known to those skilled in the art. The terms coded signals and encoded signals are interchangeably used herein.

To encode the data signals, the base station applies a PN code to the data at a rate faster than that of the data. For example, the PN code is applied to the data such that there are multiple "chips" of the code for any given element of data. Such an application of the PN code is commonly referred to as direct sequence spreading of the data. Chips and their associated chip rates are known to those skilled in the art.

Sometimes, each base station is assigned a particular timing offset of the short code to differentiate between base stations. Mobile telephones may therefore determine the identity of a particular base station based on the timing offset of the short code. Additionally, the data signals are often further encoded with a unique "covering" code. Such covering codes provide "channelization" for a signal that increases the number of unique communication channels. For example, data encoded with a covering code can further differentiate signals thereby improving detection and subsequent processing of a selected signal.

These covering codes are often used in CDMA telephony systems and typically include families of codes that are orthogonal (e.g., Walsh codes) or codes that are substantially orthogonal (e.g. quasi-orthogonal functions ("QOF")). Orthogonal covering codes and QOF covering codes have properties that allow for the differentiation of unwanted signals and are known to those skilled in the art. Walsh codes are also known to those skilled in the art.

Both the short codes and the covering codes assist in the detection of a selected signal. However, interference caused by other signals may still degrade data extraction capabilities of the selected signal. For example, as a mobile telephone communicates with a particular base station within that base station's coverage cell, signals from other base stations can interfere with the mobile telephone communication. Since cells often overlap one another to ensure that all desired geographic regions are included in the communication system's coverage area, one or more signals from one base station may interfere with the communication link, or "channel," between the mobile telephone and another base station. This effect is commonly referred to as cross-channel interference.

Cross-channel interference may also occur because some overhead channels are broadcast to all mobile telephones within the cell. These channels can "bleed" over into other cells and overpower a selected signal, thereby corrupting conveyed data. Examples of such channels include pilot channels, which are often broadcast at greater power levels and convey reference information and can be used to coherently demodulate other channels. Other potentially interfering channels may convey paging channels that alert a particular mobile telephone to an incoming call and synchronization channels that provides synchronization between a mobile telephone and a base station. Still other potentially interfering channels may include traffic channels bearing user traffic such as data and voice.

Still, other forms of interference may occur from "multipath" copies of a selected signal. Multipath can create interference because of the reception of copies of a selected signal at differing times. Multipath typically occurs because of obstructions, such as buildings, trees, et cetera, that create multiple transmission paths for a selected signal. These separate transmission paths may have unique distances that cause the signal to arrive at a receiver at differing times and is commonly referred to as co-channel interference. Additionally, these separate paths may bleed over into other cells to cause cross-channel interference.

Multipath creates co-channel interference because, among other reasons, the orthogonality of the covering code for a received signal is essentially lost due to timing offsets associated with the multipath. For example, a multipath signal having a covering code and arriving at a receiver at differing times causes a misalignment of the covering code. Such a misalignment can result in a high cross-correlation in the covering codes and a general inability to correctly retrieve conveyed data.

"Rake" receivers, such as those used in CDMA telephony systems, combine multipath signals to increase available signal strength. For example, a rake receiver may have a plurality of "fingers," wherein each finger of the rake receiver independently estimates channel gain and other signal characteristics (e.g., phase) of the selected signal to more accurately demodulate data of the selected signal and subsequently retrieve the data. Each finger is assigned a particular "path" of the selected signal (i.e., one of the paths of the multipath signal or a signal from another base station). These paths may be combined to increase signal strength. Additionally, as signal characteristics change, the fingers may be assigned or de-assigned to other "paths" of the signal to improve data retrieval.

Rake receivers can improve data retrieval of a received signal. However, present rake receivers do not substantially reduce cross-channel interference and/or co-channel interference. These interferers may still corrupt data as long as they exist in any substantial form.

SUMMARY

The present invention provides systems and methods for parallel interference suppression. In one embodiment of the invention, a processing engine is used to substantially cancel a plurality of interfering components within a received signal. The processing engine includes a plurality of matrix generators that are used to generate matrices, each matrix comprising elements of a unique component selected for cancellation. The processing engine also includes one or more processors that use the matrices to generate cancellation operators. A plurality of applicators applies the cancellation operators to parallel but not necessarily unique input signals to substantially cancel the interfering components from the input signals. These input signals may include received signals, interference cancelled signals and/or PN codes. The embodiments disclosed herein may be particularly advantageous to systems employing CDMA (e.g., such as cdmaOne and cdma2000), Wideband CDMA, Broadband CDMA and Global Positioning System ("GPS") signals. Such systems are known to those skilled in the art.

In one embodiment of the invention, a processing engine comprises:

a plurality of matrix generators, wherein each matrix generator is configured for generating a matrix comprising elements of an interfering signal selected for cancellation;

a processor communicatively coupled to the matrix generators and configured for generating a cancellation operator from each matrix; and a plurality of applicators, wherein each applicator is communicatively coupled to the processor and configured for applying one of the cancellation operators to an input signal to substantially cancel one of the interfering signals.

In another embodiment of the invention, the processing engine is configurable with a receiver and wherein the processing engine further comprises a connection element configured for receiving output signals from the applicators and for selecting received said output signals as inputs to processing fingers of the receiver.

In another embodiment of the invention, the connection element comprises a plurality of selectors wherein each selector is configured for receiving one of the output signals and for selecting said one of the output signals as one of the inputs to one of the processing fingers.

In another embodiment of the invention, each selector is further configured for receiving a digitized radio signal comprising one or more Code Division Multiple Access signals as one of the inputs to one of the processing fingers.

In another embodiment of the invention, each selector is further configured for receiving a digitized radio signal comprising one or more Wideband Code Division Multiple Access signals as one of the inputs to one of the processing fingers.

In another embodiment of the invention, each selector is further configured for receiving a digitized radio signal comprising one or more Global Positioning System signals as one of the inputs to one of the processing fingers.

In another embodiment of the invention, the output signals are interference cancelled signals.

In another embodiment of the invention, each cancellation operator is a projection operator configured for projecting a selected signal substantially orthogonal to one of the interfering signals.

In another embodiment of the invention, the projection operator comprises the form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, each of the cancellation operators comprises the form:

$$y' = y - S(S^T S)^{-1} S^T y,$$

where y' is an output cancelled signal, y is a received signal, S is one of the matrices and $S^T$ is a transpose of said one of the matrices.

In another embodiment of the invention, the processing engine further comprises an interference selector configured for selecting the interfering signals as inputs to the matrix generators.

In another embodiment of the invention, the interference selector is further configured for providing on-time interfering PN codes of the interfering signals to the matrix generators.

In another embodiment of the invention, the interference selector selects the interfering signals based on a pre-determined criteria selected from a group consisting of amplitude, timing offset, phase and code sequence.

In one embodiment of the invention, a method of canceling interference comprises:

generating a plurality of matrices, each matrix comprising elements of an interference signal selected for cancellation;

generating a cancellation operator from each of the matrices; and applying each cancellation operator in parallel to an input signal to substantially cancel one of the interference signals.

In another embodiment of the invention, generating the cancellation operator comprises generating a projection operator having a form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, applying comprises substantially canceling said one of the interfering signals according to the form:

$$y' = y - S(S^T S)^{-1} S^T y,$$

where y' is an output cancelled signal, y is a received signal, S is one of the matrices and $S^T$ is a transpose of said one of the matrices.

In another embodiment of the invention, the method further comprises selecting the interference signals for input to the matrices.

In another embodiment of the invention, the method further comprises providing on-time interfering PN codes of the interfering signals to the matrices in response to selecting.

In another embodiment of the invention, the method further comprises selecting output signals generated in response to applying, for assignment of the output signals to processing fingers of a receiver.

In another embodiment of the invention, the method further comprises transferring the output signals to the processing fingers in response to selecting said output signals as input signals to the processing fingers.

In another embodiment of the invention, the output signals are interference cancelled signals.

In another embodiment of the invention, the method further comprises receiving a Code Division Multiple Access signal.

In another embodiment of the invention, the method further comprises receiving a Wideband Code Division Multiple Access signal.

In another embodiment of the invention, the method further comprises receiving a Global Positioning System signal.

In one embodiment of the invention, a mobile handset comprises:

a receiver configured for receiving a radio signal; and a processing engine communicatively coupled to the receiver and comprising a plurality of matrix generators, wherein each matrix generator is configured for generating a matrix comprising elements of an interfering signal selected for cancellation, a processor communicatively coupled to the matrix generators and configured for generating a cancellation operator from each matrix, and a plurality of applicators, wherein each applicator is communicatively coupled to the processor and configured for applying one of the cancellation operators to an input signal to substantially cancel one of the interfering signals.

In another embodiment of the invention, the radio signal comprises a Code Division Multiple Access signal.

In another embodiment of the invention, the radio signal comprises a Wideband Code Division Multiple Access signal.

In another embodiment of the invention, the radio signal comprises a Global Positioning System signal.

DETAILED DESCRIPTION OF THE DRAWINGS

Figure 1:
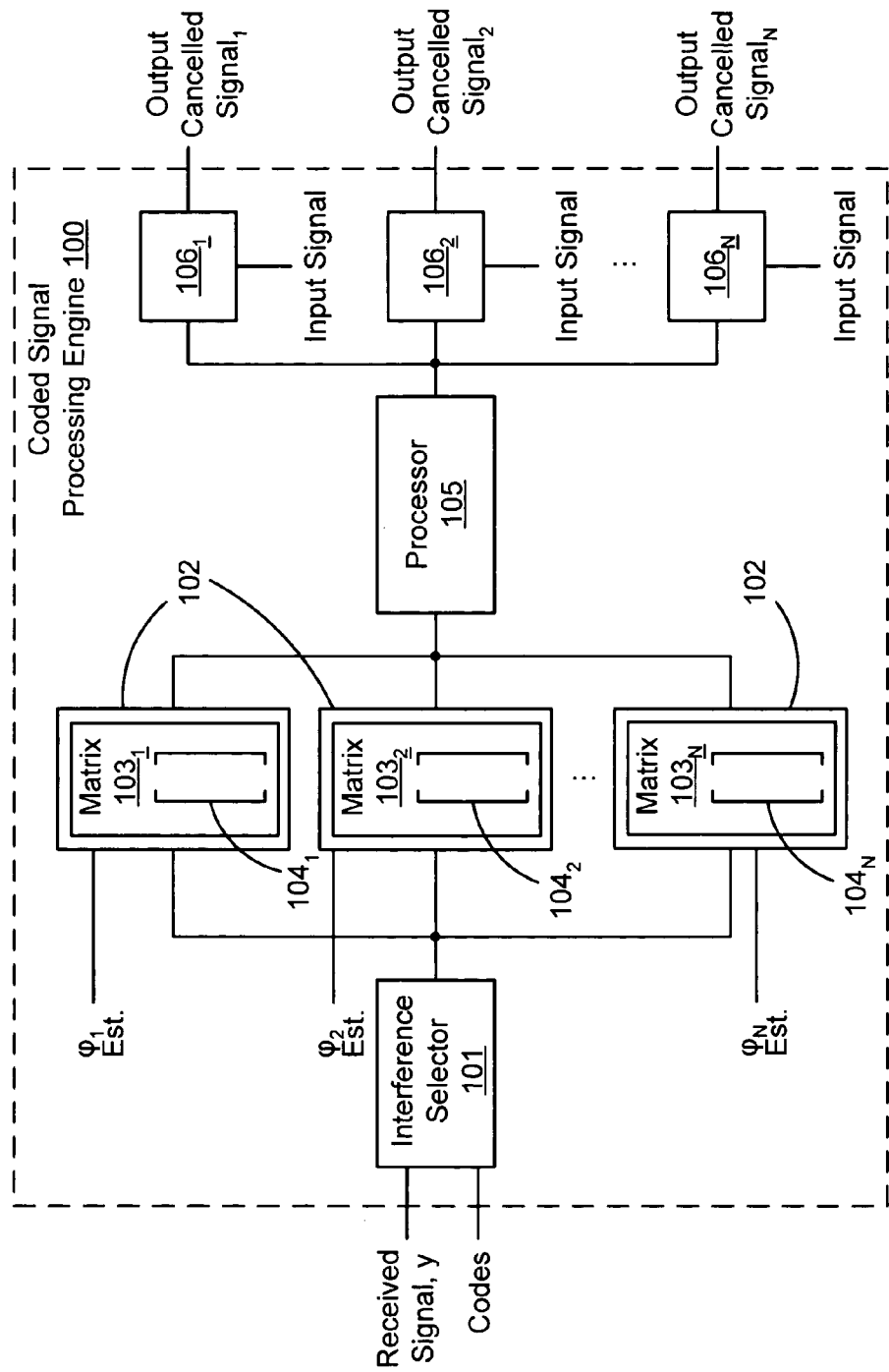
FIG. 1 is a block diagram of an exemplary coded signal processing engine in one embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

FIG. 1 is a block diagram of exemplary coded signal processing engine 100 in one embodiment of the invention. Coded signal processing engine ("CSPE") 100 is used to substantially cancel interfering components from signals. Examples of such interfering components include co-channel interference and cross-channel interference typical of CDMA telephony. CSPE 100 substantially cancels selected interfering components by applying a cancellation operator to either a received signal y or selected coded reference signals. CSPE 100 thereby generates a plurality of output cancelled signals (i.e., labeled Output Cancelled Signals$_{1...N}$, where "N" is an integer greater than one), wherein the selected interfering components are substantially removed from the received signal y/coded reference signals. The coded reference signals may be "on-time" PN codes of signals used to decode signals selected for demodulation. On-time as used herein refers to a particular timing alignment for a PN code. Such a timing alignment may be relevant to extracting data from a signal being tracked within a receiver.

In this embodiment, CSPE 100 includes interference selector 101 for selecting interfering components and for providing selected "on-time" interfering PN codes to matrix generators 102 of CSPE 100. The interference selector may select the interfering signals based on pre-determined criteria, such as amplitude, timing offset, phase and/or code sequence. Matrix generators 102 are configured for using selected interfering codes and phase estimates (labeled $\phi_{1...N}$ Est.) corresponding to those codes to generate matrices 103 (labeled matrices $103_{1...N}$). Each matrix 103 comprises one or more vectors 104 (labeled matrices $104_{1...N}$). Further, the vectors 104 comprise elements representing components of the interfering codes (e.g., such as those elements described in the '346 and the '360 applications). For example, each vector may include elements representing a unique code of an interfering signal (e.g., co-channel interference or cross-channel interference). The codes are typically Walsh covering codes and on-time PN codes of selected interferers. Each interference vector is multiplied by a phase estimate of a corresponding selected interferer. Phase estimation is exemplified in the '346 application.

As multiple vectors 104 may be used to represent multiple interfering signals, each matrix 103 may be representative of a unique plurality of interfering signals. For example, matrix $103_1$ may include a single vector representing one interfering signal $A_1$ (not shown), whereas matrix $103_2$ may include a single vector representing another interfering signal $A_2$ (not shown). The invention, however, is not intended to be limited to the exemplary embodiment shown herein.

CSPE 100 uses each matrix 103 to generate unique cancellation operators for selective cancellation of the interfering components. Accordingly, CSPE 100 includes processor 105 configured for processing matrices 103 to generate the cancellation operators. The cancellation operators may be projection operators that are used to project selected coded signals substantially orthogonal to the interference (e.g., the interference represented by the matrices 103) so as to substantially cancel or remove the interference from the selected coded signals. In a projection operator embodiment, processor 105 uses matrices 103 to generate the projection operators according to the following form:

$$P_s^\perp = I - S(S^T S)^{-1} S^T, \quad\quad (\text{Eq. 1})$$

where $P_s^\perp$ is the projection operator, I is an identity matrix, S is an interference matrix 103 and $S^T$ is a transpose of the matrix 103. Such projection operators and their associated constructions are described in the '346, the '360, the '829, the '219 and the '834 applications.

CSPE 100 applies the cancellation operator to selected input signals (labeled "Input Signal"). Each applicator 106 (labeled 106$_{1...N}$) applies one of the cancellation operators to an input signal. Each application of a cancellation operator typically provides a unique output cancelled signal which is the input signal with the selected interfering signal substantially removed. For example, using the same signal notations of "A" as described above, applicator 106$_1$ may apply a projection operator $P_{sA1}^\perp$ to an input signal. The projection operator $P_{sA1}^\perp$, in this example, is generated from a matrix 103 comprising an interfering component of signal $A_1$. Once applied to the received signal y as the input signal, applicator 106$_1$ produces an Output Cancelled Signal$_1$ that corresponds to $y_{A1}' = P_{sA1}^\perp y$, where $y_{A1}'$ is the received signal with the interfering component $A_1$ substantially removed.

Similarly, applicators 106$_2$ and 106$_N$ may apply projection operators in parallel with applicator 106$_1$ to produce the respective unique signals Output Cancelled Signal$_2$ and Output Cancelled Signal$_N$. For example, applicator 106$_2$ may apply a projection operator $P_{sA2}^\perp$ such that the applicator produces an Output Cancelled Signal$_2$ corresponding to $y_{A2}' = P_{sA2}^\perp y$, where $y_{A2}'$ is the received signal with the interfering component $A_2$ substantially removed. Parallel as used herein implies the substantially simultaneous generations of unique cancellation operators and the subsequent applications of the cancellation operators to independent input signals.

In an alternative embodiment, cancellation may be performed by applying a construction of the matrices as follows:

$$y' = y - S(S^T S)^{-1} S^T y. \quad\quad (\text{Eq. 2})$$

In such an embodiment, the received signal y is multiplied by the interference matrix construction of Eq. 1. However, that product is subtracted from the received signal y to produce an output cancelled signal y', such as $y_{A1}'$ and $y_{A21}'$. Those skilled in the art should readily recognize that the two approaches produce substantially the same result.

While one exemplary embodiment has been shown in detail, the invention is not intended to be limited to the examples described and illustrated herein. For example, applicators 106 may apply other cancellation operators to other input signals to produce a variety of output cancelled signals. One example of another input signal is an on-time reference PN code, such as that described below in FIG. 4. Examples of other methods for the production of cancellation operators include subtractive methods, decorrelators and decision feedback.

Additionally, the invention is not intended to be limited to the number of applicators 106, input signals, output cancelled signals, matrix generators 102 and processors 105. For example, processor 105 may be either a single processor configured for generating a plurality of cancellation operators or processor 105 may represent a plurality of processors each of which is similarly configured for generating a unique cancellation operator. Examples of such processors include general purpose processors and Application Specific Integrated Circuits ("ASIC"). Accordingly, the processor may be operably controlled via software and/or firmware instructions to generate the cancellation operators. Those skilled in the art are familiar with processors, ASICs, software, firmware and the various combinations thereof which may be used in such implementations.

Moreover, those skilled in the art should readily recognize that CSPE 100 in general as described herein may be implemented through software, firmware, hardware and/or various combinations thereof. For example, the generations of the cancellation operators and the subsequent cancellations of interfering signals may be computed through the use of software instructions (e.g., firmware) operable within a processor or specified in hardware architecture.

Figure 2:
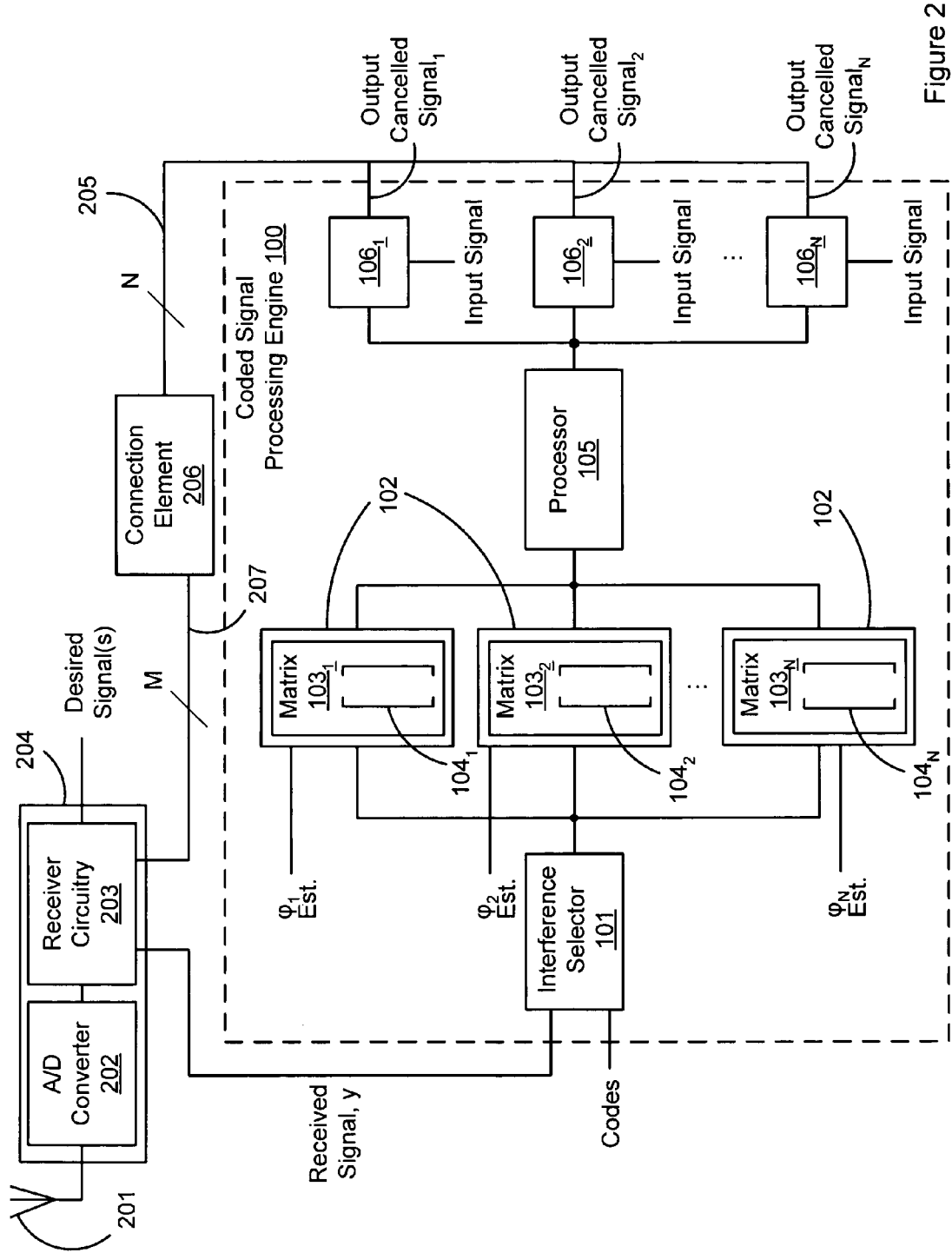
FIG. 2 is a block diagram of the exemplary coded signal processing engine configurable with a receiver in one embodiment of the invention.

FIG. 2 is a block diagram of the exemplary CSPE 100 of FIG. 1 configurable with receiver 204 in one embodiment of the invention. In this embodiment, receiver 204 receives a radio frequency ("RF") signal through antenna 201 and subsequently converts that signal to a digital received signal y using Analog-to-Digital ("A/D") converter 202. A/D converter 202 transfers the digital signal to receiver circuitry 203 for signal processing. Those skilled in the art should readily recognize that the processing of CDMA signals typically includes both In-phase ("I") and Quadrature ("Q") components. As such, the digital received signal y may include both I and Q components as well.

In this embodiment, receiver circuitry 203 is configured for transferring the digitized received signal y to CSPE 100 for cancellation of interfering signals. CSPE 100 receives the signal y as well as known codes from the interfering signals. For example, the interfering signals may be cross channel and/or co-channel interfering signals comprising known codes of CDMA telephony systems. Such codes may be input to CSPE 100 on an as needed basis or stored within a memory (not shown) local to the CSPE 100. Alternatively, the codes may be generated by processor 105 on an as needed basis.

Operable characteristics of CSPE 100 are the same as those described in FIG. 1. However, again using the same signal notations of "A" as described above, in this preferred receiver embodiment, CSPE 100 uses applicators 106$_{1...N}$ to apply cancellation operators to the input signals in the following manner:

Applicator 106$_1$ produces an Output Cancelled Signal$_1$ that corresponds to $y_{A1}' = P_{sA1}^\perp y$, where again $y_{A1}'$ is the received signal with the interfering component $A_1$ substantially removed;

Applicator 106$_2$ produces an Output Cancelled Signal$_2$ corresponding to $y_{A2}' = P_{sA2}^\perp y$; and where again $y_{A2}'$ is the received signal with the interfering component $A_2$ substantially removed.

These Output Cancelled Signal$_{1...N}$ are transferred to connection element 206 via "N" channel connection 205. For example, "N" channel connection 205 may be a communicative connection such as a data bus that allows for the transfer of "N" number of channels to connection element 206. Consequently, connection element 206 may be configurable to receive such an "N" channel connection.

Connection element 206 is configured for selectively transferring Output Cancelled Signal$_{1...N}$ to receiver circuitry 203 of receiver 204 via "M" channel connection 207. For example, connection element 206 may be a switching device, multiplexer, a plurality of multiplexers or another similar communication device that selectively transfers "N" number of signals to "M" number of channels, where "M" is also a number greater than one. As such, "M" channel connection 207 is similar to "N" channel connection 205.

The control for connection element 206 may be applied independently of cancellation processing. Consequently, connection element 206 may or may not be configured within the CSPE 100. For example, should the selection of Output Cancelled Signal$_{1\ldots N}$ be received by receiver circuitry 203 be decided by receiver 204, then connection element 206 may reside outside of the embodied CSPE 100. In a preferred embodiment, however, CSPE 100 includes the control functionality for connection element 206 that determines which of the Output Cancelled Signal$_{1\ldots N}$ are transferred to receiver circuitry 203. Accordingly, the invention should not be limited to the preferred embodiment described and shown herein.

Figure 3:
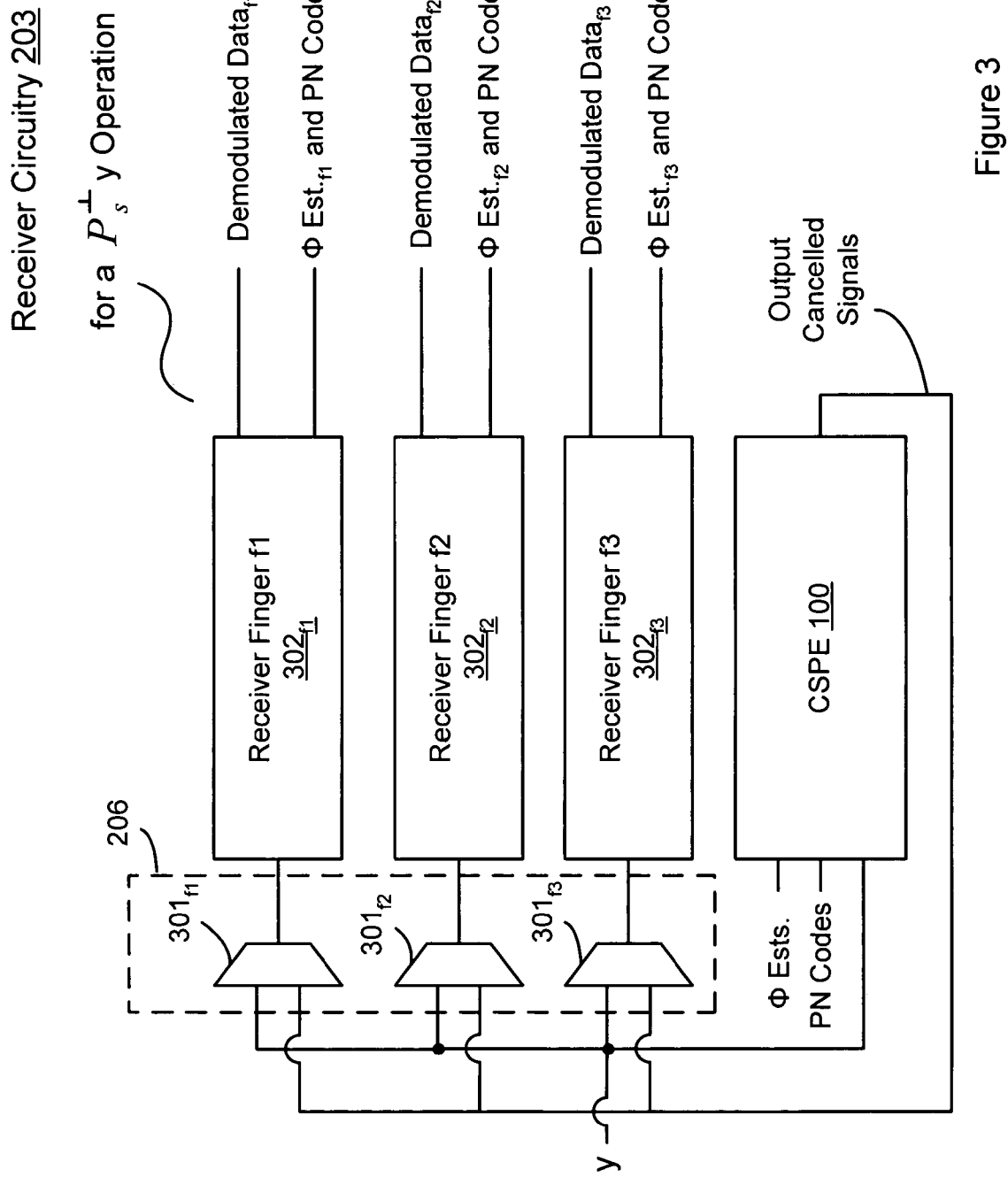
FIG. 3 is a block diagram of exemplary receiver circuitry.

FIG. 3 is a block diagram of exemplary receiver circuitry 203. In this embodiment, receiver circuitry 203 is configured with CSPE 100 via connection element 206 for selectively tracking signals through receiver fingers f1, f2 and f3 (labeled 302$_{f1}$, 302$_{f2}$ and 302$_{f3}$). For example, connection element 206 may allow the receiver circuitry 203 to track and subsequently demodulate a selected combination of Output Cancelled Signal$_{1\ldots N}$ and the received signal y through the receiver fingers f1, f2 and f3.

In a preferred embodiment, a first receiver finger f1 receives the signal y via a corresponding selector (the selectors are labeled 301$_{f1\ldots f3}$). The phase estimate φ$_{f1}$ and the PN code$_{f1}$ outputs of the first receiver finger flare transferred from the finger to CSPE 100 for producing the output cancelled signal y$_{A1}$' described in FIGS. 1 and 2. A second receiver finger f2 selectively receives either y or y$_{A1}$' via a corresponding selector for tracking of a second assigned signal. If y is transferred to the second receiver finger f2, the phase estimate φ$_{f2}$ and the PN code$_{f2}$ outputs of that second receiver finger are transferred to CSPE 100 to produce the output cancelled signal y$_{A2}$' also described in FIGS. 1 and 2. Consequently, a third receiver fingers f3 has a selection of signals y and output cancelled signals y$_{A1}$' and y$_{A2}$' to track and demodulate a third assigned signal.

In many instances, tracking, demodulation and cancellation of the signals described and shown herein the preferred embodiment is all that is necessary in CDMA telephony because there are typically only one or two signals (e.g., A1 and A2) that degrade reception beyond the point of intended data recovery. Accordingly, selective cancellation of only one or two signals may decrease processor consumption requirements and thereby improve overall processing performance of the system. As such, the embodiment should not be limited to the number of receiver fingers shown and described. More receiver fingers than those illustrated in this exemplary embodiment may be used to selectively track and demodulate signals according to the principles described herein.

Figure 4:
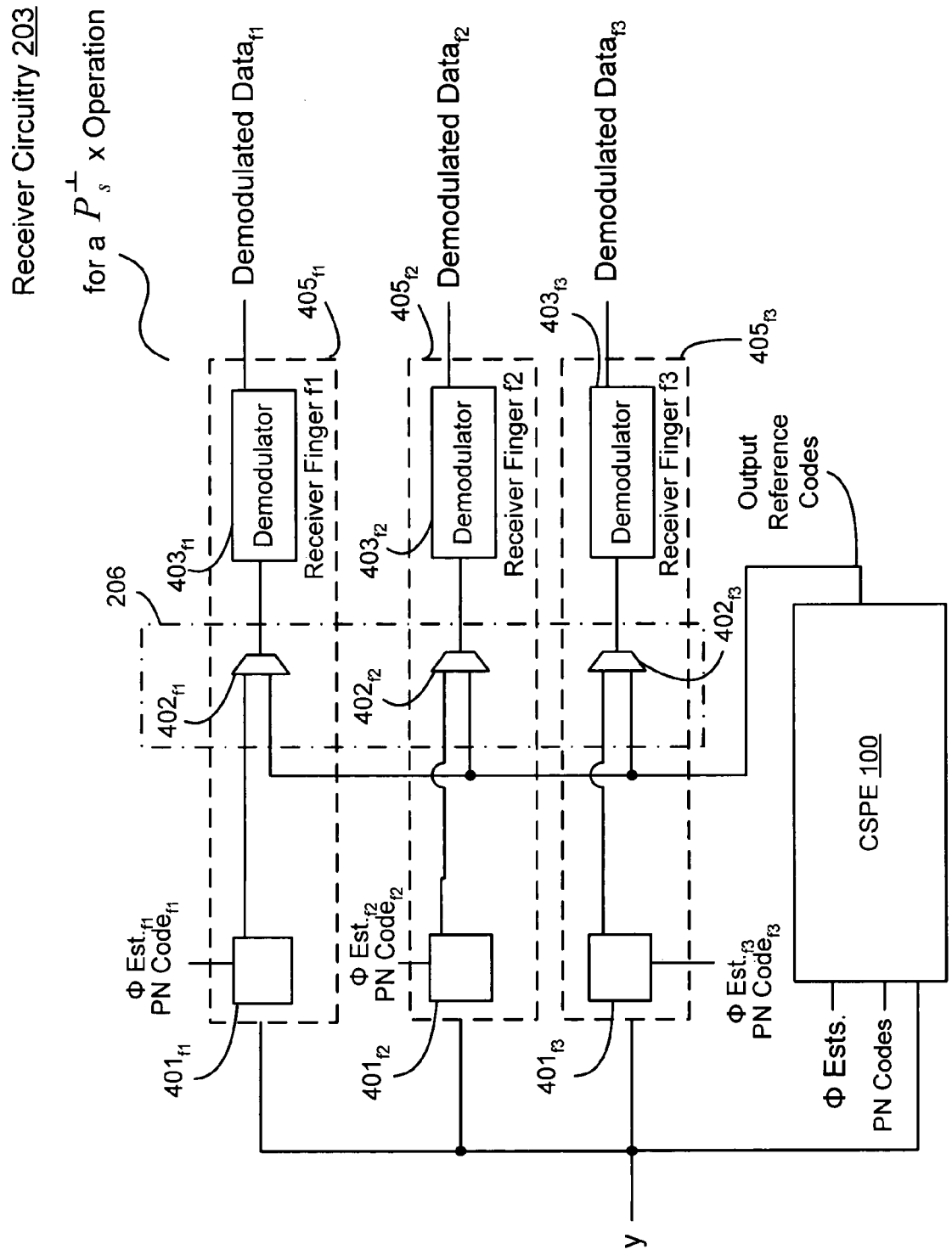
FIG. 4 is another block diagram of exemplary receiver circuitry.

FIG. 4 is another block diagram of exemplary receiver circuitry 203. In this alternative embodiment, the received signal y is transferred to receiver fingers f1, f2 and f3 (labeled 405$_{f1\ldots f3}$) and CSPE 100. Time tracking and phase estimation of the received signal y may be performed for each finger in corresponding elements 401$_{f1\ldots f3}$. Such tracking and phase estimation is used to generate on-time reference PN codes (PN code$_{f1\ldots f3}$) and is described in greater detail in the '346 application. Elements 401$_{f1\ldots f3}$ transfer the on-time reference PN codes as well as the phase estimates (labeled φ$_{f1\ldots f3}$) to CSPE 100 and to corresponding selectors 402$_{f1\ldots f3}$. CSPE 100 uses these on-time PN codes and phase estimates to generate cancellation operators that remove interfering signals from the received signal y.

Differing from the embodiment of FIG. 3, CSPE 100 uses the applicators 106 of FIGS. 1 and 2 to apply cancellation operators to the on-time PN codes to produce output cancelled versions of the codes (labeled output reference codes). Such an embodiment may conform to a cancellation of the form $P_s^{-1}x$, where x is an on-time reference PN code. These output cancelled reference codes are selectively transferred to demodulators 403$_{f1\ldots f2}$ via selectors 402$_{f1\ldots f2}$ of connection element 206. These codes are used by the demodulators 403$_{f1\ldots f2}$ to demodulate the received signal y. Such demodulation may be performed with a correlation of a reference code and a received signal over a period of a symbol and is well known to those skilled in the art.

In a preferred embodiment, a first receiver finger f1 receives the on-time reference PN code x$_{f1}$ via a first selector 402$_{f1}$ and produces the phase estimate φ$_{f1}$ and the PN code$_{f1}$ outputs. The first finger f1 then demodulates the received signal y using the code x$_{f1}$. These phase estimate φ$_{f1}$ and the PN code$_{f1}$ outputs of that first receiver finger f1 may be transferred from the finger f1 to CSPE 100 for producing the output cancelled signal x$_{A1}$', where x$_{A1}$' is the on-time reference PN code of the signal selected for demodulation without the interfering effects of the signal A1. A second receiver finger f2 selectively receives either x or x$_{A1}$' via corresponding selector 402$_{f2}$. If x is transferred to the second receiver finger f2, the phase estimate φ$_{f2}$ and the PN code$_{f2}$ outputs of receiver finger f2 are transferred to CSPE 100 to produce the output cancelled signal x$_{A2}$', where x$_{A2}$' is the on-time reference PN code of the signal selected for demodulation without the interfering effects of the signal A2. Consequently, a third receiver finger f3 has a selection of signals x$_{f3}$ and output cancelled on-time reference PN codes x$_{A1}$' and x$_{A2}$' which can be used to track and demodulate the received signal y.

Again, those skilled in the art should readily recognize that the preferred embodiment should not be limited to that which is shown and described herein. More receiver fingers than those illustrated and described herein the exemplary embodiment may be used to selectively track and demodulate signals according to the principles described herein.

Figure 5:
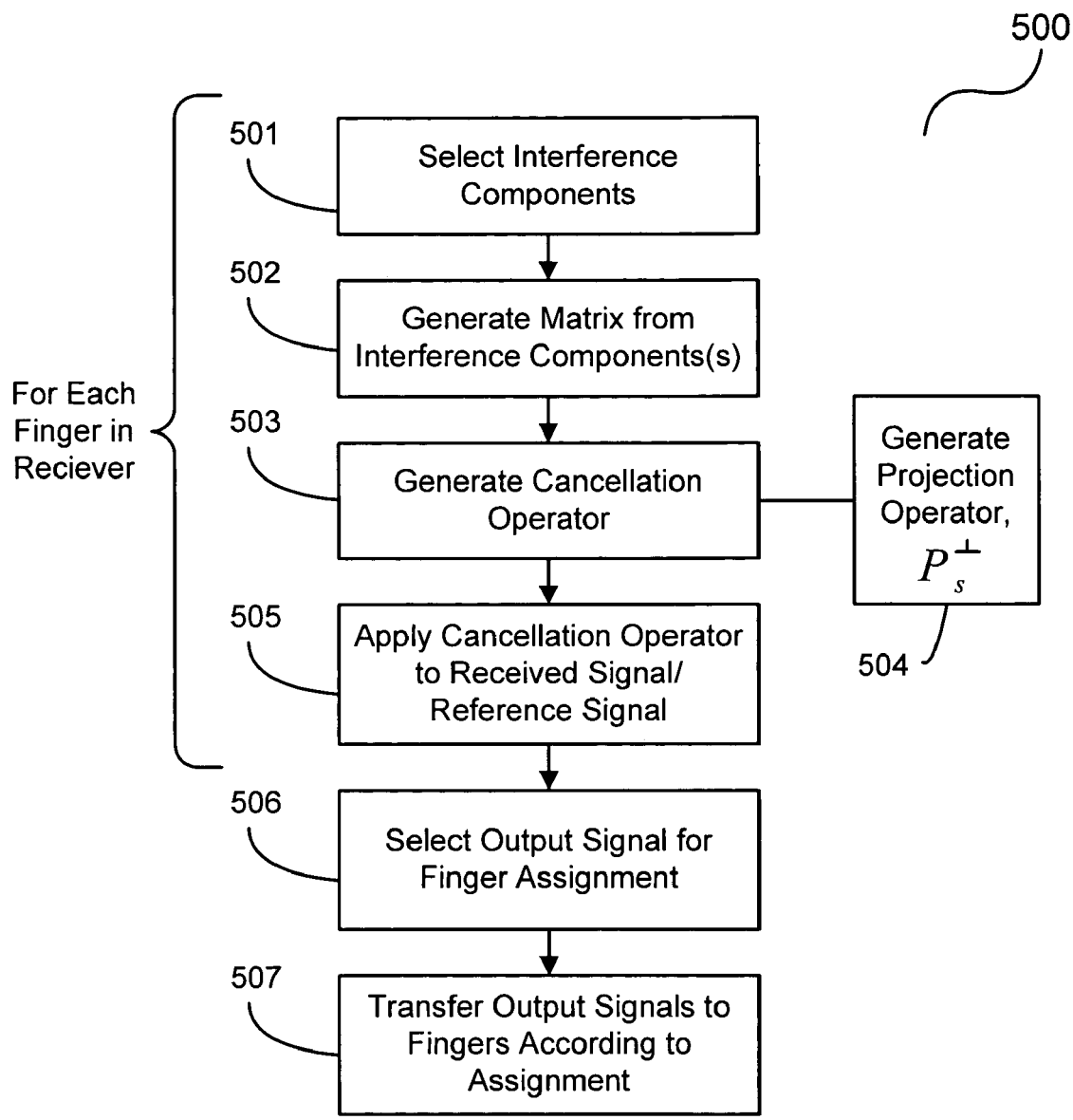
FIG. 5 is a flow chart illustrating one exemplary methodical embodiment of the invention.

FIG. 5 is a flow chart 500 illustrating one exemplary methodical embodiment of the invention. In this embodiment, one or more interference components of a received signal are selected, in element 501. These interference components are used to generate an interference matrix, in element 502. A cancellation operator is generated from the interference matrix, in element 503. The cancellation operator may be a projection operator as described in FIG. 1 that is generated in element 504 to substantially orthogonally project a received signal from interfering components. Such a projection operator may substantially cancel or remove the interfering components from the received signal. The cancellation operator is applied to either the received signal or an on-time reference PN code, in element 505.

Elements 501 through 505 are performed in parallel based on the number of receiver fingers used for tracking and demodulation in a receiver. For example, in a receiver comprising three fingers, such as the receiver circuitry 203 in FIGS. 4 and 5, elements 501 through 505 may be performed three times in a substantially simultaneous fashion. Moreover, control functionality may be configured to only select information of particular fingers. For example, if a signal does not contribute significantly to the interference, it may be selectively excluded from the cancellation process to decrease processing. Such a selection process is described in the '954 application.

The application of the cancellation operators in element 505 produces output cancelled signals such as those described herein. Once those output cancelled signals are produced, the signals are selected for finger assignments, in element 506. Such a selection process may be performed by connection element 206 in FIG. 3. Selected output cancelled signals are transferred to the receiver fingers according to their respective finger assignments, in element 507. Within their respective fingers, the output cancelled signals are either tracked and demodulated as in FIG. 3 or are used to track and demodulate a received signal as in FIG. 4.

The embodiments described herein may substantially reduce interference caused by unwanted signals and improve signal processing. For example, poor signal quality due to interference may deleteriously affect acquisition, tracking and demodulation of selected signals. A reduction of interference may, therefore, result in improved signal processing and error reduction. In regards to such benefits, the embodiments herein may advantageously require use within a CDMA telephony system. Improved processing within a CDMA telephony system may be exploited in terms of increased system capacity, transmit power reduction, system coverage and/or data rates. However, those skilled in the art should readily recognize that the above embodiments should not be limited to any particular method of signaling. For example, the embodiments disclosed herein may also be advantageous to systems employing CDMA (e.g., such as cdmaOne and cdma2000), WCDMA, Broadband CDMA and GPS signals.

Additionally, it should be noted that the above embodiments of the invention may be implemented in a variety of ways. For example, the above embodiments may be implemented from software, firmware, hardware or various combinations thereof. Those skilled in the art are familiar with software, firmware, hardware and their various combinations. To illustrate, those skilled in the art may choose to implement aspects of the invention in hardware using ASIC chips, Digital Signal Processors ("DSP") and/or other integrated circuitry (e.g., custom designed circuitry and Xilinx chips). Alternatively, aspects of the invention may be implemented through combinations of software using Java, C, C++, Matlab, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

The invention claimed is:

1. A processing engine, comprising:
a plurality of matrix generators, wherein each matrix generator is configured for generating a matrix comprising elements of an interfering signal selected for cancellation;
a processor communicatively coupled to the matrix generators and configured for generating a cancellation operator from each matrix; and
a plurality of applicators, wherein each applicator is communicatively coupled to the processor and configured for applying at least one of the cancellation operators to an input signal to substantially cancel at least one of the interfering signals.

2. The processing engine of claim 1, wherein the processing engine is configurable with a receiver and wherein the processing engine further comprises a connection element configured for receiving output signals from the applicators and for selecting received said output signals as inputs to processing fingers of the receiver.

3. The processing engine of claim 2, wherein the connection element comprises a plurality of selectors wherein each selector is configured for receiving one of the output signals and for selecting said one of the output signals as one of the inputs to one of the processing fingers.

4. The processing engine of claim 3, wherein each selector is further configured for receiving a digitized radio signal comprising one or more Code Division Multiple Access signals as one of the inputs to one of the processing fingers.

5. The processing engine of claim 3, wherein each selector is further configured for receiving a digitized radio signal comprising one or more Wideband Code Division Multiple Access signals as one of the inputs to one of the, processing fingers.

6. The processing engine of claim 3, wherein each selector is further configured for receiving a digitized radio signal comprising one or more Global Positioning System signals as one of the inputs to one of the processing fingers.

7. The processing engine of claim 3, wherein the output signals are interference cancelled signals.

8. The processing engine of claim 1, wherein each cancellation operator is a projection operator configured for projecting a selected signal substantially orthogonal to one of the interfering signals.

9. The processing engine of claim 8, wherein the projection operator comprises the form:

$$P_s^{195} = I - S(S^T S)^{-1} S^T,$$

where $P_s^\perp$ is the projection operator, I is an identity matrix, S is one of the matrices and $S^T$ is a transpose of said one of the matrices.

10. The processing engine of claim 1, wherein each of the cancellation operators comprises the form:

$$y' = y - S(S^T S)^{-1} S^T y,$$

where y' is an output cancelled signal, y is a received signal, S is one of the matrices and $S^T$ is a transpose of said one of the matrices.

11. The processing engine of claim 1, further comprising an interference selector configured for selecting the interfering signals as inputs to the matrix generators.

12. The processing engine of claim 11, wherein the interference selector is further configured for providing on-time interfering PN codes of the interfering signals to the matrix generators.

13. The processing engine of claim 11, wherein the interference selector selects the interfering signals based on a pre-determined criteria selected from a group consisting of amplitude, timing offset, phase and code sequence.

14. A method of canceling interference, comprising:
generating a plurality of matrices, each matrix comprising elements of an interference signal selected for cancellation;
generating a cancellation operator from each of the matrices; and
applying each cancellation operator in parallel to an input signal to substantially cancel at least one of the interference signals.

15. The method of claim 14, wherein generating the cancellation operator comprises generating a projection operator having a form:

$$P_s^{195} = I - S(S^T S)^{-1} S^T,$$

where $P_s^\perp$ is the projection operator, I is an identity matrix, S is one of the matrices and $S^T$ is a transpose of said one of the matrices.

16. The method of claim 14, wherein applying comprises substantially canceling said one of the interfering signals according to the form:

$$y'=y-S(S^TS)^{-1}S^Ty,$$

where y' is an output cancelled signal, y is a received signal, S is one of the matrices and $S^T$ is a transpose of said one of the matrices.

17. The method of claim 14, further comprising selecting the interference signals for input to the matrices.

18. The method of claim 17, further comprising providing on-time interfering PN codes of the interfering signals to the matrices in response to selecting.

19. The method of claim 14, further comprising selecting output signals generated in response to applying, for assignment of the output signals to processing fingers of a receiver.

20. The method of claim 19, further comprising transferring the output signals to the processing fingers in response to selecting said output signals as input signals to the processing fingers.

21. The method of claim 19, wherein the output signals are interference cancelled signals.

22. The method of claim 14, further comprising receiving a Code Division Multiple Access signal.

23. The method of claim 14, further comprising receiving a Wideband Code Division Multiple Access signal.

24. The method of claim 14, further comprising receiving a Global Positioning System signal.

25. A system for canceling interference, comprising:
means for generating a plurality of matrices, each matrix comprising elements of an interference signal selected for cancellation;
means for generating a cancellation operator from each of the matrices; and
means for applying each cancellation operator in parallel to an input signal to substantially cancel at least one of the interference signals.

26. The system of claim 25, wherein the means for generating the cancellation operator comprises means for generating a projection operator having a form:

$$P_s^{195}=I-S(S^TS)^{-1}S^T,$$

where $P_s^{195}$ is the projection operator, I is an identity matrix, S is one of the matrices and $S^T$ is a transpose of the one of the matrices.

27. The system of claim 25, wherein the means for applying comprises means for substantially canceling said one of the interfering signals according to the form:

$$y'=y-S(S^TS)^{-1}S^Ty,$$

where y' is an output cancelled signal, y is a received signal, S is one of the matrices and $S^T$ is a transpose of said one of the matrices.

28. The system of claim 25, further comprising means for selecting the interference signals for input to the matrices.

29. The system of claim 25, further comprising means for providing on-time interfering PN codes of the interfering signals to the matrices in response to selecting.

30. The system of claim 25, further comprising means for selecting output signals generated in response to applying, for assignment of the output signals to processing fingers of a receiver.

31. The system of claim 30, further comprising means for transferring the output signals to the processing fingers in response to selecting said output signals.

32. The system of claim 30, wherein the output signals are interference cancelled signals.

33. The system of claim 25, further comprising means for receiving a Code Division Multiple Access signal.

34. The system of claim 25, further comprising means for receiving a Wideband Code Division Multiple Access signal.

35. The system of claim 25, further comprising means for receiving a Global Positioning System signal.

36. A mobile handset, comprising:
a receiver configured for receiving a radio signal; and
a processing engine communicatively coupled to the receiver and comprising
a plurality of matrix generators, wherein each matrix generator is configured for generating a matrix comprising elements of an interfering signal selected for cancellation,
a processor communicatively coupled to the matrix generators and configured for generating a cancellation operator from each matrix, and
a plurality of applicators, wherein each applicator is communicatively coupled to the processor and configured for applying at least one of the cancellation operators to an input signal to substantially cancel at least one of the interfering signals.

37. The mobile handset of claim 36, wherein the processing engine further comprises a connection element configured for receiving output signals from the applicators and for selecting received said output signals as inputs to processing fingers of the receiver.

38. The mobile handset of claim 37, wherein the connection element comprises a plurality of selectors wherein each selector is configured for receiving one of the output signals and for selecting said one of the output signals as one of the inputs to one of the processing fingers.

39. The mobile handset of claim 38, wherein each selector is further configured for receiving a digitized radio signal comprising one or more Code Division Multiple Access signals as one of the inputs to one of the processing fingers.

40. The mobile handset of claim 38, wherein each selector is further configured for receiving a digitized radio signal comprising one or more Wideband Code Division Multiple Access signals as one of the inputs to one of the processing fingers.

41. The mobile handset of claim 38, wherein each selector is further configured for receiving a digitized radio signal comprising one or more Global Positioning System signals as one of the inputs to one of the processing fingers.

42. The mobile handset of claim 38, wherein the output signals are interference cancelled signals.

43. The mobile handset of claim 36, wherein each cancellation operator is a projection operator configured for projecting a selected signal substantially orthogonal to one of the interfering signals.

44. The mobile handset of claim 43, wherein the projection operator comprises the form:

$$P_s^{195}=I-S(S^TS)^{-1}S^T,$$

where $P_s^\perp$ is the projection operator, I is an identity matrix, S is one of the matrices and $S^T$ is a transpose of said one of the matrices.

45. The mobile handset of claim 36, wherein each of the cancellation operators comprises the form:

$$y'=y-S(S^TS)^{-1}S^Ty,$$

where y' is an output cancelled signal, y is a received signal, S is one of the matrices and $S^T$ is a transpose of said one of the matrices.

46. The mobile handset of claim 36, further comprising an interference selector configured for selecting the interfering signals as inputs to the matrix generators.

47. The mobile handset of claim 46, wherein the interference selector is further configured for providing on-time interfering PN codes of the interfering signals to the matrix generators.

48. The mobile handset of claim 46, wherein the interference selector selects the interfering signals based on a predetermined criteria selected from a group consisting of amplitude, timing offset, phase and code sequence.

49. The mobile handset of claim 36, wherein the radio signal comprises a Code Division Multiple Access signal.

50. The mobile handset of claim 36, wherein the radio signal comprises a Wideband Code Division Multiple Access signal.

51. The mobile handset of claim 36, wherein the radio signal comprises a Global Positioning System signal.

* * * * *